United States Patent
Ishigaki et al.

(10) Patent No.: US 6,619,618 B2
(45) Date of Patent: Sep. 16, 2003

(54) GATE VALVE

(75) Inventors: Tsuneo Ishigaki, Tsukuba-gun (JP); Seiichi Furutate, Tsukuba-gun (JP); Kenji Waragai, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 134 days.

(21) Appl. No.: 09/929,485

(22) Filed: Aug. 15, 2001

(65) Prior Publication Data

US 2002/0027214 A1 Mar. 7, 2002

(30) Foreign Application Priority Data

Sep. 7, 2000 (JP) .................................... 2000-271989

(51) Int. Cl.$^7$ .............................................. F16K 25/00
(52) U.S. Cl. ...................................... 251/158; 251/193
(58) Field of Search .................................... 251/158, 193, 251/203, 204, 326, 328, 329

(56) References Cited

U.S. PATENT DOCUMENTS 4,721,282 A * 1/1988 Shawver et al. .............. 251/62

FOREIGN PATENT DOCUMENTS

| JP | 9-303577 | 11/1997 |
|----|----------|---------|
| JP | 10-227365 | 8/1998 |
| JP | 2000-097370 | 4/2000 |
| JP | 2001-165350 | 6/2001 |

* cited by examiner

*Primary Examiner*—Gene Mancene
*Assistant Examiner*—Melvin A. Cartagena
(74) *Attorney, Agent, or Firm*—Oblon, Spivak, McClelland, Maier & Neustadt, P.C.

(57) ABSTRACT

In a gate valve having a rectangular gate, generation of flection at opposite end portions due to bending moment applied to the gate is suppressed easily. For this purpose, in the gate valve in which a central portion of a longer side of the rectangular gate is mounted to a tip end of a shaft operated by driving of a cylinder device and the gate is pressed against a valve seat provided around a rectangular valve opening by tilting the shaft after the gate is moved to a position facing the valve opening by movement of the shaft by driving of the cylinder device, the gate is formed to have an uneven wall thickness including a large thickness in a vicinity of a fulcrum portion connected to the shaft and a small thickness on each of opposite end portion sides.

1 Claim, 3 Drawing Sheets

GATE VALVE

TECHNICAL FIELD

The present invention relates to a gate valve used for opening and closing of a vacuum chamber and particularly to a gate valve in which a gate comes in contact with and separates from a rectangular valve seat.

PRIOR ART

As a gate valve for opening and closing a flow path between chambers, there are conventionally known valves as disclosed in Japanese Patent Application Laid-open No. 9-303577, Japanese Patent Application Laid-open No. 10-227365, and the like, for example, in which a gate is mounted to a tip end of a shaft driven by a cylinder device and the gate is pressed against a valve seat mounted around a valve opening by tilting the shaft after moving the gate to a position facing the valve opening by the shaft.

In the gate valve, a sealant 33 at a periphery of the rectangular gate 32 is normally brought into contact with and separated from the valve seat 31 provided around a rectangular valve opening 30 as shown in FIGS. 4 and 5 because of a flow path section between the gate valve and the vacuum chamber and the like. Therefore, if a central portion of a longer side of the gate 32 is fixed to the shaft 34 and the gate 32 is brought into contact with and separated from the valve seat 31, flection δ is generated at opposite ends of the gate 32 as shown with a two-dot dashed line in FIG. 4 when the gate valve is upsized and a length L between seal portions on a side of the longer side of the gate 32 is large to some extent, though there is no problem when the gate is relatively small.

In other words, in the gate valve, a reaction force applied to the gate 32 from the valve seat 31 when the sealant 33 of the gate 32 receives a force F of the shaft 34 and is pressed against the valve seat 31 is obtained as the product of a load per unit length on a seal line and a length of the seal line. In this case, the product of the seal length M and the load per unit length acts as a concentrated load on each of opposite end portions of the longer side of the gate 32 while the load acts as a uniform load on a portion of the length L in a longitudinal direction of the gate 32. Therefore, the load acting on the gate 32 is distributed such that the concentrated load acting on each of the opposite end portions of the longer side where the maximum bending moment is applied becomes extremely large and the opposite end portions are the most likely to be distorted due to stress and bending.

If the flection δ is generated in the opposite end portions of the gate 32 as described above, a sealing property of the sealant 33 is impaired. Therefore, measures are taken in such a manner that a thickness of the gate 32 is increased to increase mechanical strength to thereby increase second moment of area or in such a manner that the shaft 34 is divided into a plurality of connecting portions in a fork shape or a plurality of shafts are provided, for example, to thereby distribute fulcrum portions to substantially reduce the length L and to reduce the flection at the opposite ends.

If the thickness of the gate 32 is increased, a thickness of the gate valve itself increases, an overall weight increases, and vibration increases in opening and closing of the gate. If the gate 32 is retained at a plurality of positions by means of dividing the shaft 34 into the plurality of connecting portions and the like, a structure for this purpose becomes complicated and cost increases and a vacuum property may be impaired in some cases while dimensions of the gate valve can be reduced relatively.

DISCLOSURE OF THE INVENTION

The present invention aims to solve the above-described problems and it is a technical object of the invention to provide a gate valve in which generation of flection δ at opposite end portions due to bending moment acting on the gate can be easily suppressed in the above gate valve.

It is another technical object of the invention to provide a gate valve in which a mounting structure of a gate and a shaft to each other is improved and second moment of area of the gate is increased to thereby reduce flection at opposite ends of the gate.

It is another technical object of the invention to provide a gate valve in which weight of the gate is reduced by enhancement of mechanical strength of the gate and an amount of deformation of the gate when a seal is provided is reduced to evenly apply a sealing force with a small valve closing force to thereby carry out sealing with a small amount of leakage.

It is yet another technical object of the invention to provide a gate valve in which, because it is unnecessary to strongly press the gate against the valve seat, it is possible to use a small-sized cylinder device for pressing the gate against the valve seat with a small force and therefore it is unnecessary to increase overall member strength.

To achieve the above objects, in a gate valve of the invention, a central portion of a longer side of a rectangular gate being mounted to a tip end of a shaft operated by driving of a cylinder device and the gate being pressed against a valve seat provided around a rectangular valve opening by tilting the shaft with tilting means after the gate is moved to a position facing the valve opening by driving the shaft with the cylinder device, the gate is formed to have an uneven wall thickness including a large thickness in a vicinity of a fulcrum portion connected to the shaft and a small thickness on each of opposite end portion sides.

In the above gate valve, it is effective that a connecting hole for connecting the shaft for driving the gate is formed in a fulcrum portion of the gate, the connecting hole is formed such that a thickness of the gate on a side of a contact face with the valve seat is large and that a thickness of the gate on a side of an opposite face is small, and the tip end of the shaft is inserted into the connecting hole to connect the gate to the shaft.

In the gate valve having the above structure, because the thickness of the fulcrum portion at the center of the gate which receives the maximum bending stress due to the force from the shaft is increased to give the gate an uneven wall thickness for suppressing flection at the opposite end portions due to the bending moment, the mechanical strength of the gate itself is effectively enhanced and the gate in which flection of the opposite end portions is small can be formed as a lightweight gate. Because the connecting hole is formed in the gate in connecting of the gate and the shaft and because the thickness receiving tensile stress on the side of the contact face with the valve seat is increased and the thickness on the opposite side receiving compression is reduced to increase the second moment of area, it is possible to further reduce flection of the opposite end portions of the gate.

Moreover, because an amount of deformation of the gate when a seal is provided is reduced by enhancement of the mechanical strength of the gate, it is possible to evenly apply a sealing force with a small valve closing force to carry out sealing with a small amount of leakage. Furthermore, because it is unnecessary to strongly press the gate against the valve seat, it is possible to use the small-sized cylinder device and it is unnecessary to increase overall member strength.

DETAILED DESCRIPTION OF THE INVENTION

Figure 1:
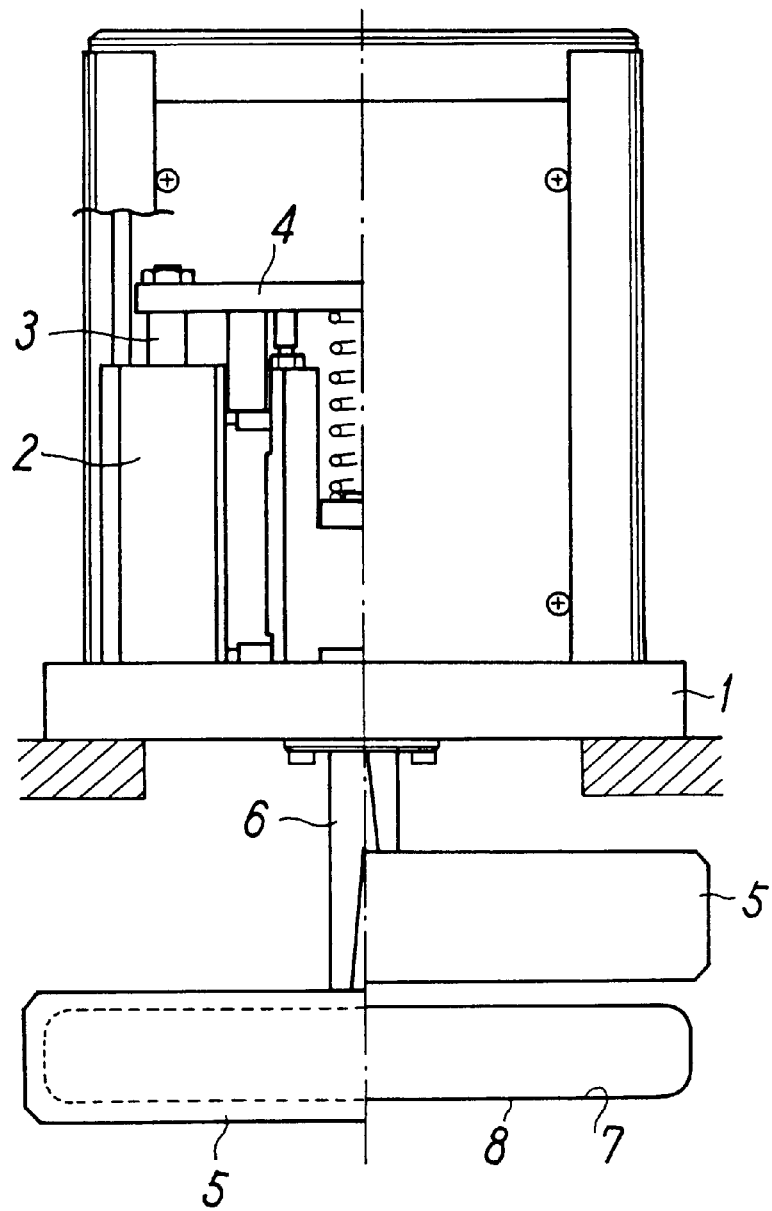
FIG. 1 is a partially cutaway front view of an embodiment of a gate valve according to the present invention, a left half showing a state in which a gate is in a position facing a valve seat and a right half showing a state in which a gate is in a an open position of the valve.
Figure 2:
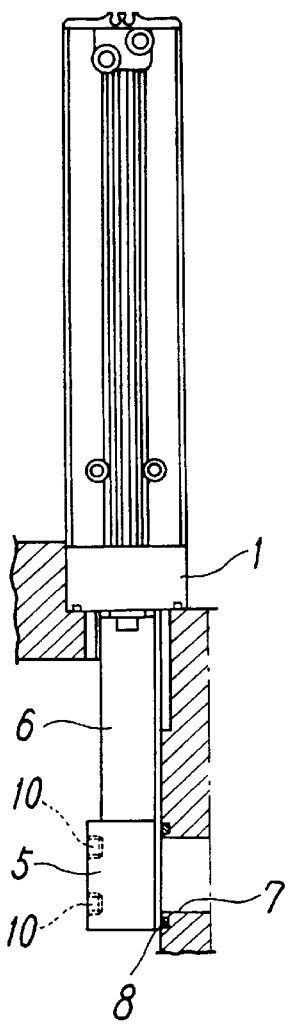
FIG. 2 is a partially cutaway side view of FIG. 1.
Figure 3:
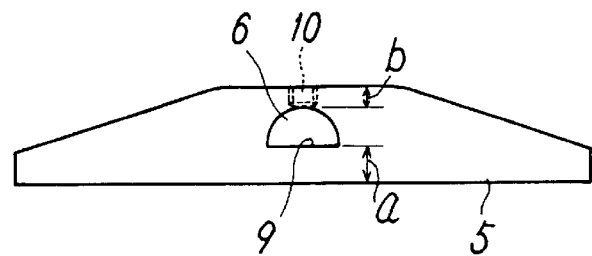
FIG. 3 is a plan view of the gate in the above embodiment.
Figure 4:
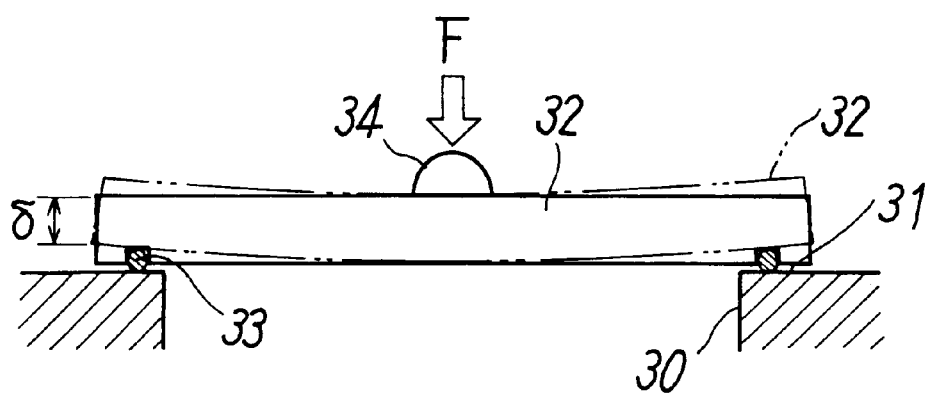
FIG. 4 is a sectional view of a gate in a known gate valve.
Figure 5:
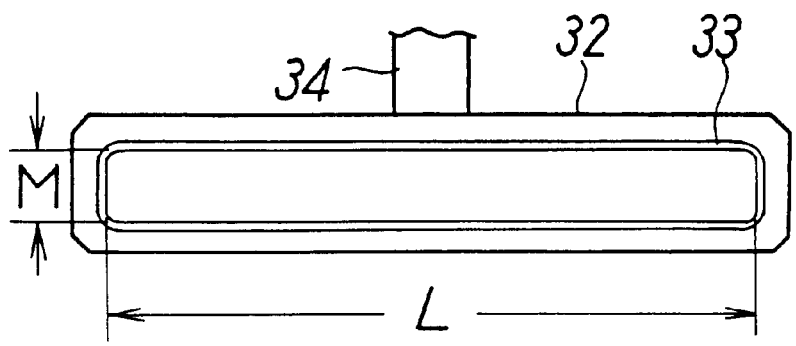
FIG. 5 is a front view of the gate in the known gate valve.

FIGS. 1 to 3 show an embodiment of a gate valve of the present invention.

This gate valve includes a pair of cylinder devices (one of which is not shown) 2 on a base 1 forming a main portion of a main body frame, a connecting plate 4 connected to piston rods 3 in these cylinder devices 2 is coupled to a shaft 6 for driving a gate 5, and the shaft 6 moves the gate 5 up and down between a valve opening position separated upward from a valve opening 7 and shown in a right half in FIG. 1 and a position facing a valve seat 8 and shown in a left half of FIG. 1 and FIG. 2.

The shaft 6 airtightly passes through the base 1 through a bellows (not shown) and is supported for tilting by a horizontal shaft provided in parallel to a surface of the drawing on the base 1. In a state in which the gate 5 has been moved to the position facing the valve opening 7 shown in the left half of FIG. 1 and FIG. 2 by driving of the cylinder device 2, the shaft 6 tilts about the horizontal shaft by further driving of the cylinder device 1 to press the gate 5 against the valve seat 8 provided around the valve opening 7. Tilting means for tilting the shaft 6 is not specifically shown in the drawings and conventionally-known arbitrary means can be employed as the tilting means.

Therefore, after moving the gate 5 to the position facing the valve opening 7 by driving the shaft 6 by the cylinder device 2, the cylinder device 2 is further driven to tilt the shaft 6 by the tilting means to thereby press the gate 5 against the valve seat 8 around the valve opening 7. Such means is known conventionally and generally and such known means can be used properly.

The valve opening 7 is in a rectangular shape as shown in the drawing, the gate 5 for coming in contact with and separating from the valve seat 8 around the valve opening 7 is in a rectangular shape corresponding to a shape of the valve seat 8, and a central portion on a side of a longer side of the gate 5 is mounted to a tip end of the shaft 6.

The gate 5 has a larger wall thickness in a vicinity of a fulcrum portion at a center of the gate 5 which receives maximum bending stress due to a force from the shaft 6 when the gate 5 is connected to the shaft 6 and has a smaller wall thickness on each of opposite end portion sides of the gate 5 as is clear from FIG. 3. In this manner, the gate 5 has an uneven wall thickness for suppressing flection of the opposite end portions due to bending moment.

Furthermore, the gate 5 is formed with a semicircular connecting hole 9 for connecting the shaft 6 to the fulcrum portion, a semicircular portion formed at the tip end of the shaft 6 is inserted into the connecting hole 9, and a screw 10 is screwed down into the gate 5 to thereby fix the shaft 6. The connecting hole 9 has a plane on a side of a contact face with the valve seat 8 and an arc-shaped face on an opposite side.

The connecting hole 9 is formed such that a wall thickness "a" of the gate 5 on the side of the contact face with the valve seat 8 is large and that a wall thickness "b" on a side of an opposite face is small. Thus, second moment of area of the gate 5 is increased to suppress flection of the opposite ends of the gate 5.

In the gate valve having the above structure, because the thickness of the fulcrum portion at the center of the gate 5 which receives the maximum bending stress due to the force from the shaft 6 is increased to suppress flection of the opposite end portions of the gate 5 due to the bending moment, it is possible to form the gate 5 in which flection of the opposite end portions is small as a lightweight and small-sized gate.

Because the connecting hole 9 is formed in the gate 5 without fixing the shaft 6 to a back of the gate 5 in connecting of the gate 5 and the shaft 6 and because the thickness receiving tensile stress on the side of the contact face with the valve seat 8 is increased and the thickness on the opposite side receiving compression is reduced to increase the second moment of area, it is possible to further reduce flection of the opposite end portions of the gate 5.

Moreover, as described above, because an amount of deformation of the gate 5 when a seal is provided is reduced by enhancement of mechanical strength of the gate 5, it is possible to evenly apply a sealing force with a small valve closing force to carry out sealing with a small amount of leakage. Furthermore, it is possible to improve fatigue resistance of the gate 5 by smaller bending force applied to the gate 5. Because it is unnecessary to strongly press the gate 5 against the valve seat 8, it is possible to use the small-sized cylinder devices 2 and it is unnecessary to increase overall member strength.

According to the gate valve of the invention described above in detail, it is possible to provide a gate valve in which generation of flection at the opposite end portions of the gate due to the bending moment applied to the gate can be easily suppressed and the second moment of area of the gate is increased by improvement of a mounting structure of the gate and the shaft to each other to thereby further reduce flection at the opposite ends of the gate.

What is claimed is:

1. A gate valve comprising:

a rectangular gate being mounted to a tip end of a shaft operated by driving a cylinder device and the gate being pressed against a valve seat provided around a rectangular valve opening by tilting the shaft with a tilting member after the gate is moved to a position facing the valve opening by driving the cylinder device, wherein the gate is formed to have an uneven wall thickness including a thickness in a vicinity of a fulcrum portion connected to the shaft which is large and a thickness on each of opposite end portion sides which is small, and wherein a semi-circular connecting hole is formed in the vicinity of the fulcrum portion, the connecting hole is formed in a state that the thickness of the gate on a side of a contact face with the valve seat is large and that the thickness of the gate on a side of an opposite face is small, a semi-circular portion formed at the tip end of the shaft is inserted into the connecting hole, and the semi-circular portion is fixed to the gate by a screw screwed to a rear face of the gate.

* * * * *